June 26, 1934.   F. M. CLARK   1,964,684
ELECTRICAL APPARATUS
Original Filed April 2, 1931
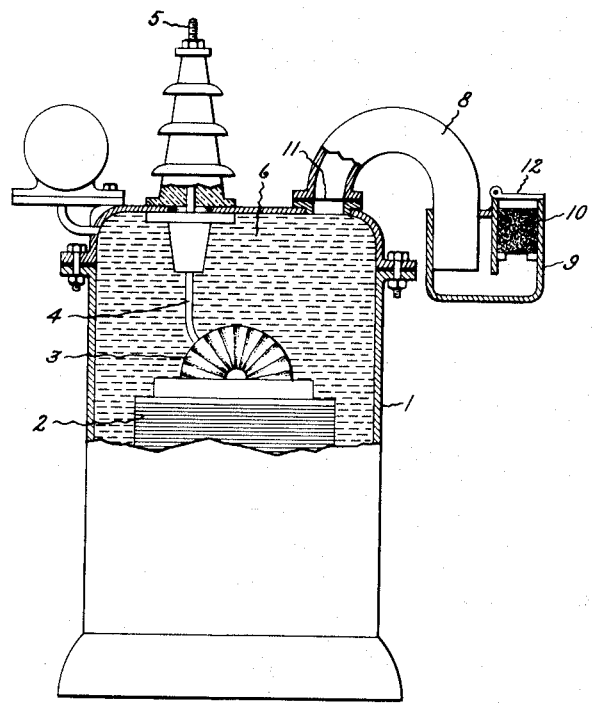
Inventor:
Frank M. Clark,
by Harry E. Dunham
His Attorney.

Patented June 26, 1934

1,964,684

UNITED STATES PATENT OFFICE 1,964,684

ELECTRICAL APPARATUS

Frank M. Clark, Pittsfield, Mass., assignor to General Electric Company, a corporation of New York Original application April 2, 1931, Serial No. 527,204. Divided and this application September 14, 1933, Serial No. 689,426

4 Claims. (Cl. 175—361)

The present application is a division of my prior application Serial No. 527,204 filed April 2, 1931 (as a result of which United States Patent 1,931,455 has been issued on October 17, 1933) and relating to electrical devices, such for example, as transformers, capacitors, switches, and the like.

In accordance with one of the features of invention of said prior application a liquid material consisting of a halogenated hydrocarbon compound, or a mixture of such compounds, is employed as the dielectric and cooling agent in such devices. When a compound of this type is decomposed, as for example, by being subjected to an electric arc, chemically active gaseous halogen compounds are formed which are obnoxious if allowed to accumulate in an enclosed space, such as a room or building housing the electrical apparatus.

In accordance with the invention covered by the present divisional application an absorber for such gases is provided as an adjunct for electrical devices containing halogenated hydrocarbon. As will be hereinafter more fully explained, it is one of the features of my invention to employ an absorber containing an alkaline material which is maintained out of contact both from the atmosphere and from the liquid in the electrical device in connection with which the absorber is used, the seal being broken only when the pressure rises within the transformer or other device by the evolution of gas from the dielectric material.

The accompanying drawing illustrates in side elevation and partly in section an electrical transformer provided with a gas absorber in accordance with my invention.

Referring to this drawing, the electrical transformer here illustrated comprises a tank 1 containing a core 2 and the usual electric windings 3 which are connected to external contact devices in a well understood manner. Only one electric conductor 4 leading to the windings 3 is illustrated in the drawing, this conductor leading to an external terminal 5. The other conductors and their external contact terminals are omitted to render the drawing as simple as possible. Contained within the tank 1 is a liquid insulating and cooling medium 6, which is fully described in the parent application Serial No. 527,204, and which may assume a number of forms. For example, this dielectric material may consist of liquid chlorinated diphenyl or of chlorinated benzene (preferably a mixture of different isomers of trichlor benzene) or a mixture of chlorinated diphenyl and chlorinated benzene or of a mixture of chlorinated diphenyl oxide and trichlor benzene. I may use, for example, a mixture of equal parts of pentachlor diphenyl and trichlor benzene. In any event, I prefer to employ a dielectric material in which the proportion of hydrogen and halogen is substantially equal so that the gases evolved consist substantially wholly of halogen hydride which is non-inflammable.

The transformer tank is connected by a conduit 8 to an absorbing chamber 9 which contains a charge 10 of soda lime, or similar basic material. Between the conduit 8 and the tank 1 is a frangible diaphragm 11 consisting of glass, or other suitable material, which is capable of being ruptured when gases are liberated within the transformer tank 1. The diaphragm may be chosen to rupture when the pressure within the tank 1 rises to ten pounds to the square inch. The absorbing chamber 9 is sealed from the atmosphere by a hinged closure 12 which prevents access of the atmosphere but is easily opened by gas under pressure within the absorbing chamber.

During normal operation of the transformer when no gas or no appreciable quantity of gas is liberated from the halogenated dielectric material the gas absorber charge 10 is protected from gases which would cause it in the course of time to become inactive. For example, unless the absorber 9 were sealed from the atmosphere the soda lime charge would pick up moisture from the atmosphere and would become less effective. On the other hand, if it were not sealed from the tank 1 by the frangible diaphragm 11 the absorber would also lose its effectiveness by small amounts of vapor gradually escaping during the course of time from the liquid halogen compound 6.

If during the operation of the transformer for any reason an electric arc should form between any of its parts this arc playing through the halogenated dielectric 6 then the rapid liberation of gas will cause rapid increase of pressure within the tank rupturing the diaphragm 11 and allowing the gases to be absorbed and combined with the basic material 10. The diaphragm 11 and the absorbing chamber with its connecting conduit also prevents undue loss of liquid material from the transformer by the ebullition of the gases.

While I have shown and described my invention with particular reference to a transformer it should be understood that this particular device has been shown and described only for illustrative purposes. An absorber such as shown and described may be used in connection with large capacitors, switches and other electric devices in which a quantity of decomposable liquid is contained within a closed receptacle.

What I claim as new and desire to secure by Letters Patent of the United States is:

1. An apparatus comprising a container, an electric device in said container, a dielectric material in contact with said device, means for absorbing gas evolved from said dielectric material, and gas confining means located between said container and said gas-absorbing means, said means being capable of confining gas within said container at a pressure which does not materially exceed about 10 pounds to the square inch but releasing gas at materially higher pressure.

2. An apparatus comprising a container, an electric device in said container, a halogenated dielectric material in contact with said device, a conduit leading from said container, and arranged for escape of gas therefrom, a frangible diaphragm between said container and said conduit, and means communicating with said conduit for absorbing gas evolved during operation from said dielectric material.

3. A transformer comprising a container, electrical windings therein, a chlorinated hydrocarbon surrounding said windings, a conduit leading from said container and arranged for the escape of gas therefrom, a frangible diaphragm between said container and said conduit, and means communicating with said conduit and sealed from the atmosphere for absorbing gas evolved during operation from said hydrocarbon.

4. A transformer comprising a main sealed container, electrical windings therein, a dielectric material surrounding said windings which will evolve chemically active gases when subjected to an electric arc, an auxiliary chamber provided with means for absorbing such gases, a conduit connecting said main container and said side chamber and a gas-impervious diaphragm in said conduit which is capable of being ruptured upon abnormal rise of gaseous pressure within said main container.

FRANK M. CLARK.